UNITED STATES PATENT OFFICE.

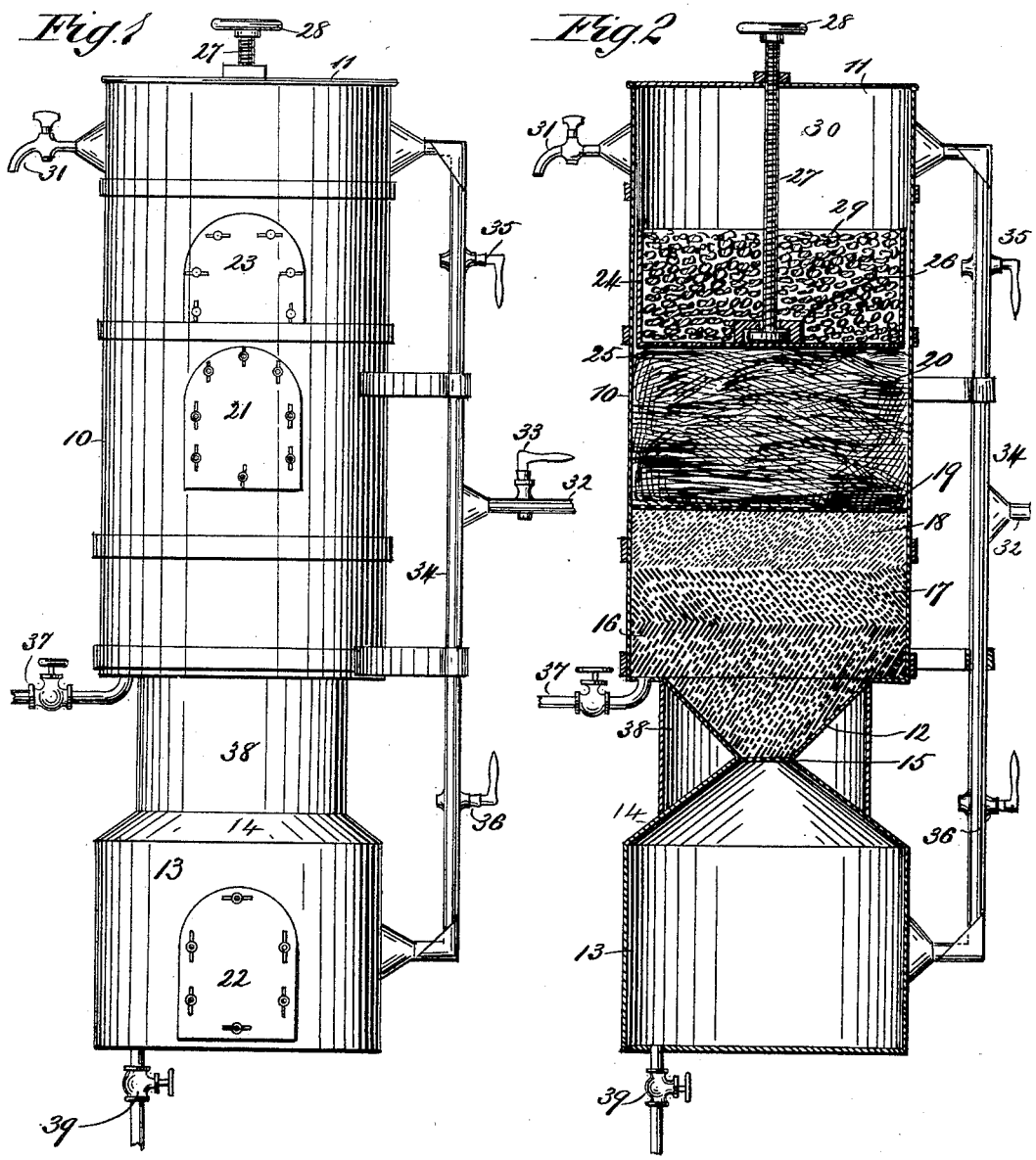

FERDINAND LASCAR, OF NEW YORK, N. Y.

FILTER.

SPECIFICATION forming part of Letters Patent No. 424,679, dated April 1, 1890.

Application filed May 25, 1889. Serial No. 312,101. (No model.)

*To all whom it may concern:*

Be it known that I, FERDINAND LASCAR, of the city, county, and State of New York, have invented a new and useful Improvement in Filters, of which the following is a full, clear, and exact description.

My invention relates to an improvement in filters, and has for its object to provide an apparatus for filtering water and other liquids.

The object of the invention is to so construct the apparatus that the filtered water will pass off containing the same amount of air as when admitted.

The object of the invention is also to provide an accumulating-chamber in which the gross impurities will be left, the water passing free therefrom to the main filtering mass.

A further object of the invention is to provide a means whereby, when the water has been passed through the apparatus, it is effectually freed from bacteria, microscopic algæ, and other impurities which are so frequent a menace to health, and will have become a sparkling potable water of the highest purity.

Another object of the invention is to so construct the apparatus that the first law in regard to the processes of filtration—that is, cleanliness—can be observed.

The invention consists of the novel construction and combination of the several parts, as will be hereinafter more fully set forth, and pointed out in the claim.

Reference is to be had to the accompanying drawings, forming a part of this specification, in which similar figures of reference indicate corresponding parts in both the views.

Figure 1 is a side elevation of the filter, and Fig. 2 is a central vertical section through the same.

The great danger that exists in many processes of filtration is that the filter serves in many cases as a receptacle for the multiplication of bacteria. This I have sought to avoid by using steam to sterilize the apparatus and filtering material whenever it is needed, and also by providing a means whereby the material I mainly depend upon for filtration can be conveniently and expeditiously removed without interfering with the bulk of the filtering material, and wherein the entire apparatus may be cleaned without loss of such material.

The filter consists of a hollow body 10, provided with a closely-fitting and hermetically-sealed top or cover 11. The lower portion or bottom of the body 10 is preferably made conical, as illustrated at 12 in Fig. 2, and to the said conical bottom of the body a receptacle 13 is attached, having a close bottom and close sides and a close conical cap or cover 14, which cap or cover is rigidly secured to the conical portion of the body, as is likewise illustrated in Fig. 2.

At the junction of the receptacle 13 with the body both the body and receptacle are open, and at said junction a hair-sieve 15 is horizontally inserted having a coarse mesh. The lower receptacle 13 provides what I term an "accumulating-chamber."

In the bottom of the body 10, I introduce a mass of gravel 16, which gravel mass rests upon the sieve 15, and extends a slight distance up into the main portion of the body. Upon the gravel 16, which is usually coarse, I place a bed of fine gravel 17, and upon the fine gravel-bed 17 a bed of sand 18 is located. Upon top of the bed of sand 18 a perforated or reticulated horizontal partition 19 is placed, the said partition being of such a contour as to neatly fit the interior walls of the body 10. Upon the partition 19 a mass of chemically-prepared or impregnated jute 20 is placed, and in the body 10, at that portion containing the jute, a man-hole is made provided with a cover 21, as illustated in Fig. 1, which cover is normally sealed to the body in any suitable or approved manner. Another man-hole is produced in the receptacle 13, provided with a like cover 22, and above the man-hole 21 a second man-hole is formed in the body, having a suitable cover 23.

Within the body a dished receptacle 24 is introduced, adapted to fit therein snugly and yet be capable of being elevated when occasion may demand. The bottom of this dished receptacle 24 is perforated, as illustrated at 25, and this receptacle usually consists of a disk provided with an upwardly-extending peripheral flange, as best shown in Fig. 2.

Upon the upper face of the bottom of the dished receptacle 24, within a suitable socket 26 formed thereon, the lower end of a threaded rod 27 is swiveled, which rod extends upward through an aperture in the cover, the walls of which are interiorly threaded, the upper projecting end of the rod being provided with a knob or hand-wheel 28. If the cover is not sufficiently thick to admit of a thread being formed in the walls of the aperture through which the rod 27 passes, a nut may be secured at this point threaded to receive the rod. The dished receptacle 24 is adapted to contain coarse gravel 29, and the said receptacle is of a height sufficient to provide a chamber 30 between the upper edge of the gravel-receptacle and the top or cover of the body.

Near the upper end of the body an outlet tube or pipe 31 is introduced, and the water-supply pipe 32, which is provided with a suitable valve 33, is connected with a stand-pipe 34, the said stand-pipe being connected at the upper end with the body 10 near the top and preferably at a point opposite the outlet 31. The lower end of the stand-pipe is connected in any approved manner with the receptacle 13 or accumulating-chamber.

The stand-pipe 34 is provided with two valves 35 and 36, one located near the upper end and the other near the lower end.

Into the bottom of the body 10 of the filter a steam-pipe 37 is introduced, provided with a suitable valve, and the reduced portion of the bottom of the body is strengthened by means of a sleeve or casing 38, attached to the bottom near the outer edge and to the upper surface of the receptacle 13.

In the bottom of the receptacle 13 a waste or blow-off pipe 39 is introduced.

In operation the upper valve 35 in the stand-pipe having been closed and the valves 33 and 36 opened, the water passes in through the water-supply pipe 32 down the stand-pipe and into the receptacle 13. As the water stands some time in the said receptacle before being able to pass upward through the body of the filter, it settles to a great extent and the mud or dirt or other gross impurities remain in the chamber formed by the receptacle 13, while the comparatively pure water is further cleansed by being forced upward through the mass of filtering material 16, 17, and 18, and from thence the water passes through the chemically-prepared jute and up through the gravel 29 in the dish-like receptacle 24 out through the outlet 31. As the water passes through the gravel 29 up upon the top of the filtering material, the water becomes aerated, or, in other words, becomes again charged with air, which it had previously lost in passing through the lower layers of filtering material.

When it is necessary or desirable to cleanse the filter, the valves 33, 35, and 36 are closed and the valve in the steam-pipe is opened. The steam entering at the bottom of the body forces its way upward through the entire mass of filtering material, heating and scouring the same in its passage. The valve 39 is opened to permit the exit of the steam, and when a ready exit is desired the man-hole covered by the door 22 is opened. To further cleanse the filter, if so desired, the gravel-receptacle 24 is elevated, the man-hole door 22 removed, and the valve 36 is closed, the valves 33 and 35 being open. The water now enters the stand-pipe and passes out of the same into the body of the filter at the top and down directly upon the mass of filtering material, through said filtering material into the receptacle 13, and from thence out through the man-hole therein, thus effectually cleansing every portion of the filter. Again it may become desirable to remove the chemically-prepared jute and insert fresh material, in which event this is readily accomplished without disturbing the gravel or the sand beneath the perforated partition 19 by simply removing the cover or door 21 and uncovering the man-hole in that portion of the body in which the jute-bed is located.

Having thus described my invention, I claim as new and desire to secure by Letters Patent—

The combination, with a filter provided with a man-hole in one side, covered by a detachable door or gate, and a receptacle having a perforated bottom and adapted to contain coarse gravel, vertically adjustable in the upper portion of the filter, of a mass of vegetable fiber located beneath the gravel-receptacle and opposite the man-hole in the body, a perforated partition beneath the vegetable fiber, and layers of fine gravel, sand, and coarse gravel located beneath the said partition, all combined for operation substantially as shown and described.

FERDINAND LASCAR.

Witnesses:
J. F. ACKER, Jr.,
C. SEDGWICK.